Patented Oct. 4, 1927.

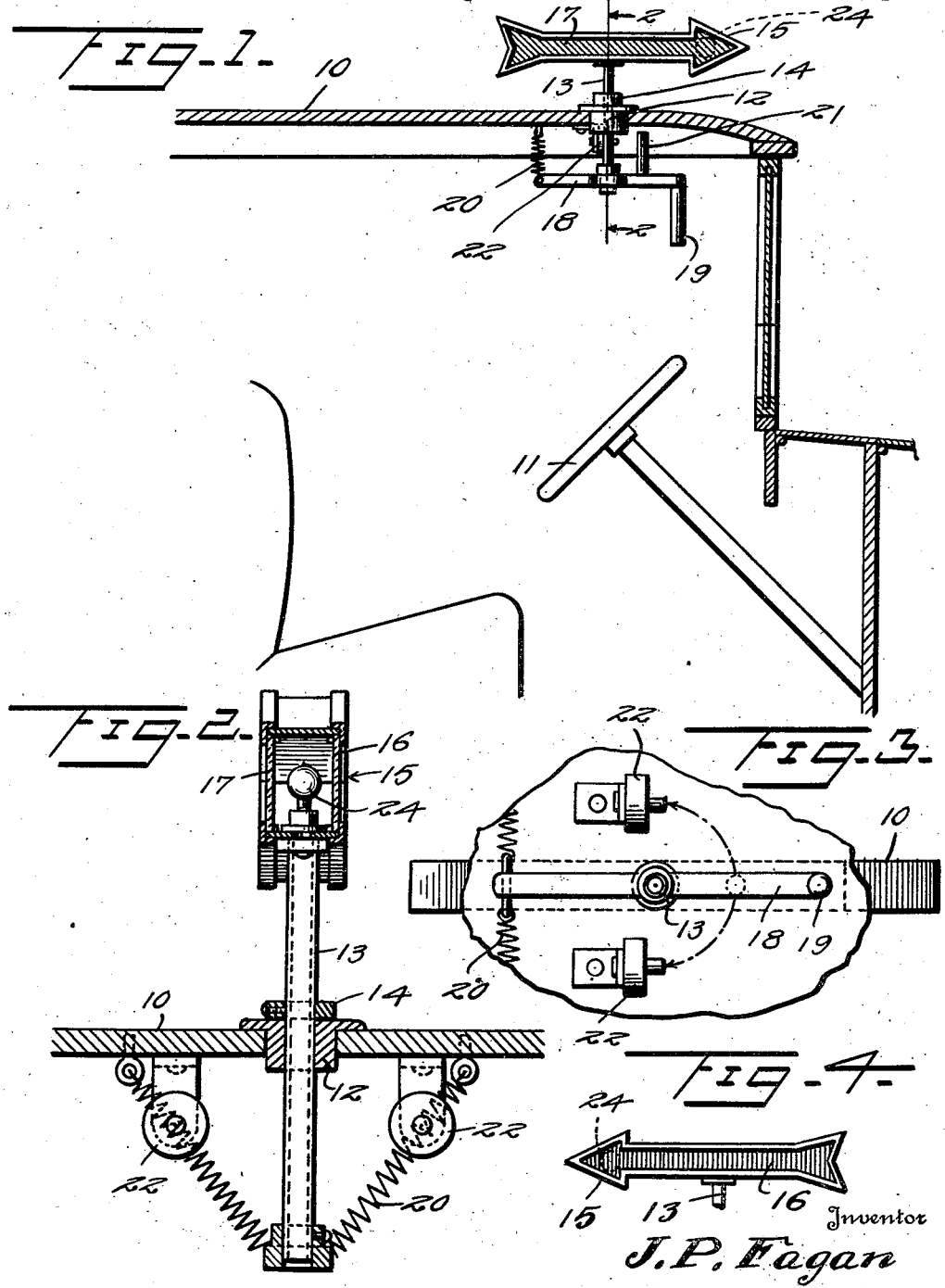

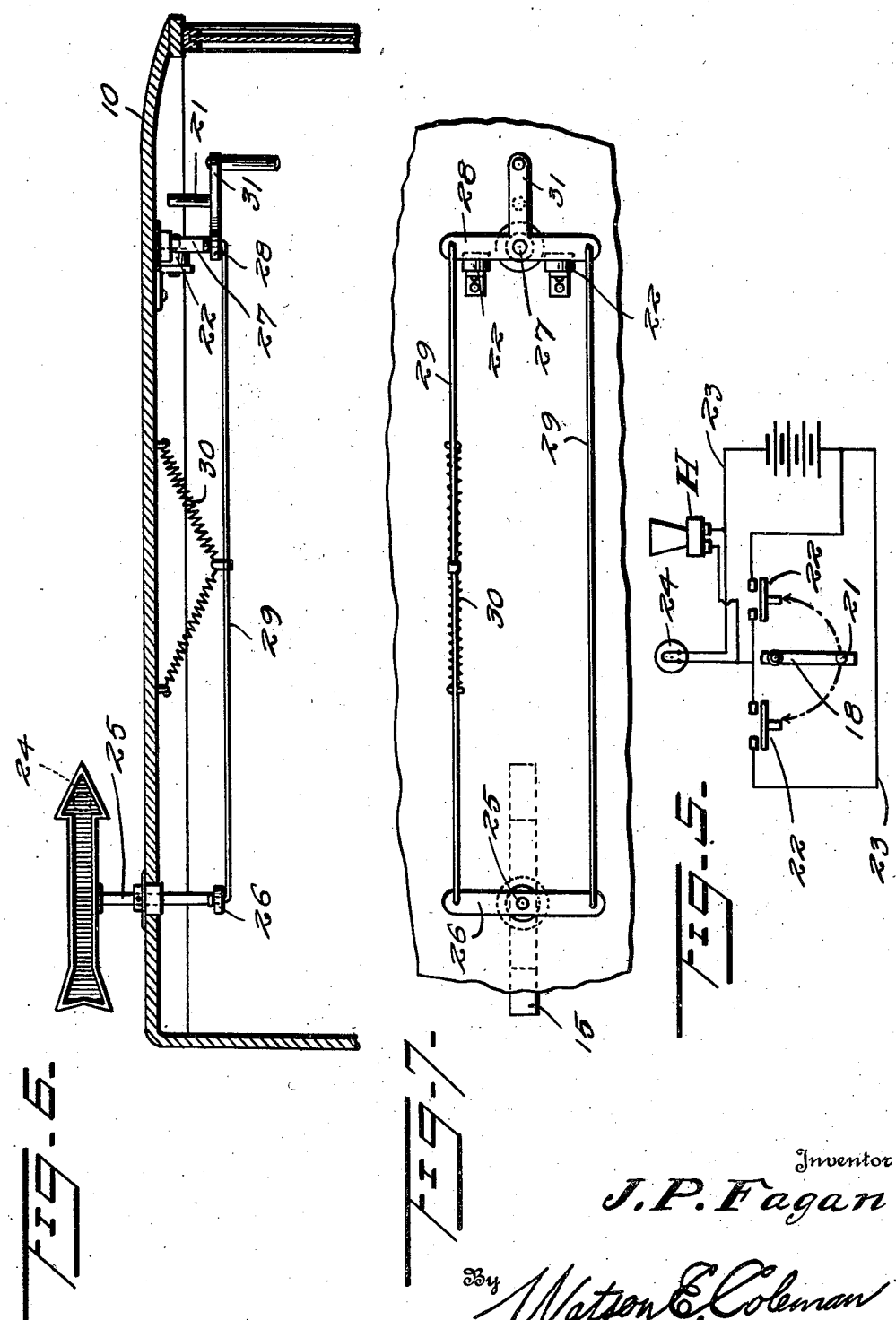

1,644,640

UNITED STATES PATENT OFFICE.

JAMES PAT FAGAN, OF LA JUNTA, COLORADO.

VEHICLE SIGNAL.

Application filed August 31, 1926. Serial No. 132,871.

This invention relates to vehicle signals and more particularly to a semaphore signal adapted to be located at the exterior and preferably at the top of a closed car and operated from the interior of the car.

An important object of the invention is to provide operating means for the signal which, when shifted to move the semaphore arm, likewise actuates or causes to be actuated an audible signal.

A further object of the invention is to produce a device of this character, the operating mechanism of which may be conveniently arranged with relation to the driver without in any manner interfering with the normal operation of the car.

These and other objects I attain by the construction shown in the accompanying drawings, wherein for the purpose of illustration is shown a preferred embodiment of my invention and wherein:—

Figure 1 is a view partially in section showing a signal constructed in accordance with my invention applied to a vehicle;

Figure 2 is an enlarged sectional view on the line 2—2 of Figure 1;

Figure 3 is a bottom plan view of the apparatus;

Figure 4 is a side elevation of the signal;

Figure 5 is a wiring diagram showing the connections employed with the signal;

Figure 6 is a view similar to that shown in Figure 1 showing a modified mounting of the apparatus whereby the signal is disposed at the rear of the vehicle;

Figure 7 is a bottom plan view thereof.

Referring now more particularly to the drawings, the numeral 10 generally designates the ceiling of a vehicle which, in accordance with my invention, above the steering wheel 11 of the vehicle is provided with a vertically directed journal 12 in which is rotatably mounted a shaft 13. The shaft is provided with a collar 14 engaging the upper end of the journal and limiting downward movement of the shaft. The upper end of the shaft has secured thereto a traffic signal 15, at present disclosed as an arrow having at opposite sides of the head thereof red and green lenses 16 and 17 of which the red lens is located upon the left side of the signal. The lower end of the shaft has secured thereto, intermediate its ends, a horizontally extending bar 18, one end of which is provided with an operating handle 19.

A spring 20 is secured to the opposite end of the shaft intermediate its ends and has its extremities secured to the ceiling of the car, at points spaced transversely of the vehicle, so that the tension of the spring maintains the horizontal bar 18 in a position where it extends longitudinally of the vehicle. Since the pointer or signal 15 is secured to the shaft in alignment with the bar 18, the pointer will likewise be normally directed longitudinally of the vehicle. These springs further serve to return the pointer to its normal position after each actuation thereof. The bar 18 operates adjacent the ceiling of the car and has secured thereto an upwardly projecting arm 21. Secured to the ceiling of the car at opposite sides of the arm 21 are ordinary punch or push button switches 22 which, when the bar is swung in either direction from its normal position, are engaged by the arm 21 to close the circuit to an audible signal, preferably the horn H of the vehicle. The shaft and signal are hollow to permit the passage of lead wires 23 to a bulb 24 located within the signal for illuminating the the lenses 16 and 17.

In the form shown in Figs. 6 and 7, a signal shaft 25 is mounted at the rear of the vehicle and has secured to its lower end a transversely extending arm 26. A second shaft 27 is rotatably supported from the forward end of the vehicle above the steering wheel and the lower end of this shaft is likewise provided with a transverse arm 28. The ends of the arms 27 and 28 are connected by links 29 which are in the form of iron rods and to one of these links a spring 30 is connected at its center. The ends of the spring 30 are secured to the ceiling of the car at points spaced longitudinally of the rod from the point of attachment of the center of the spring thereto, so that the rod and accordingly the signal is maintained in one position. At the lower end of the shaft 27 a horizontally extending handle 31 is secured, this handle having the arm 21 for coaction with the push buttons 22. It will be quite obvious that in giving a signal, it is simply necessary for the operator to engage the handle and swing it toward that side of the vehicle at which he wishes to turn. The signal will be correspondingly shifted and at the same time the push buttons which serve to limit the movement of the handle will close the circuit to the audible signal, calling the attention of the drivers of oncoming vehicles and of pedestrains to the vehicle bearing the signal.

Since the construction of the signal is obviously capable of a certain range of change and modification without materially departing from the spirit of the invention, I do not limit myself to such specific structure except as hereinafter claimed.

I claim:

A vehicle signal comprising a bearing, a shaft journaled therein, an oblanceolate signal element carried at one end of the shaft, a bar carried at the opposite end of the shaft and disposed approximately parallel with said signal element, spring means connected with the bar for holding the shaft at a normal position in the bearing, cushioning members fixed with relation to the bearing, and a stop member carried by the bar and adapted to engage the cushioning members, said cushioning members serving as stops for limiting the turning movement of the shaft in the bearing.

In testimony whereof I hereunto affix my signature.

JAMES PAT FAGAN.